(12) United States Patent
Tsukahara et al.

(10) Patent No.: US 8,514,350 B2
(45) Date of Patent: Aug. 20, 2013

(54) LIGHT EMITTING DEVICE, DISPLAY DEVICE, AND COLOR CONVERSION SHEET

(75) Inventors: Tsubasa Tsukahara, Tokyo (JP); Yasushi Ito, Kanagawa (JP); Naoji Nada, Kanagawa (JP); Yoshiro Oshima, Kanagawa (JP); Hideya Chubachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 12/988,557

(22) PCT Filed: Apr. 20, 2009

(86) PCT No.: PCT/JP2009/057843
§ 371 (c)(1),
(2), (4) Date: Oct. 19, 2010

(87) PCT Pub. No.: WO2009/131092
PCT Pub. Date: Oct. 29, 2009

(65) Prior Publication Data
US 2011/0037926 A1    Feb. 17, 2011

(30) Foreign Application Priority Data

Apr. 25, 2008 (JP) ................................. 2008-115719
Feb. 13, 2009 (JP) ................................. 2009-031317

(51) Int. Cl.
*G02F 1/1335* (2006.01)

(52) U.S. Cl.
USPC .............. 349/71; 349/122; 349/138; 349/153

(58) Field of Classification Search
USPC ................. 349/71, 70, 65, 106, 138, 122, 64, 349/57, 153; 362/97.1, 97.2, 611, 612, 615, 362/617, 621, 293, 235, 606, 84
See application file for complete search history.

(56) References Cited

U.S. PATENT DOCUMENTS

| | | | |
|---|---|---|---|
| 7,229,703 B2 * | 6/2007 | Kawashima et al. | 428/690 |
| 7,839,072 B2 * | 11/2010 | Horiuchi et al. | 313/501 |
| 2001/0000436 A1 * | 4/2001 | Nose et al. | 349/65 |

(Continued)

FOREIGN PATENT DOCUMENTS

| | | |
|---|---|---|
| JP | 2004-352928 | 12/2004 |
| JP | 2005-108635 | 4/2005 |

(Continued)

*Primary Examiner* — Thoi Duong
(74) *Attorney, Agent, or Firm* — K&L Gates LLP

(57) ABSTRACT

There is provided is a display device capable of suppressing deterioration of the color conversion layer which converts one color light into another color light, and realizing favorable handling and a display device using the color conversion layer, and a color conversion sheet. A phosphor sheet 10 is, for example, arranged immediately above a light source such as a blue light emitting diode, and obtained by sealing a phosphor layer 11, which converts a part of blue light into another color light, by sealing sheets 12A and 12B. The sealing sheets 12A and 12B are bonded with the phosphor layer 11 in between by a first bonding layer 13 and a second bonding layer 14. Since the phosphor layer 11 is sealed by the sealing sheets 12A and 12B including a water vapor barrier layer 122 held between resin sheets 121A and 121B, water vapor is prevented from entering into the phosphor layer, and a chemical reaction is less likely to be generated between the phosphor layer 11 and the water vapor barrier layer 122.

20 Claims, 13 Drawing Sheets

(56) References Cited

U.S. PATENT DOCUMENTS

| | | |
|---|---|---|
| 2006/0039152 A1* | 2/2006 | Ito .................................. 362/293 |
| 2006/0132011 A1 | 6/2006 | Shimizu et al. |
| 2006/0139955 A1 | 6/2006 | Noh et al. |
| 2007/0057626 A1 | 3/2007 | Kurihara et al. |
| 2008/0170176 A1* | 7/2008 | Shen ................................ 349/64 |

FOREIGN PATENT DOCUMENTS

| | | |
|---|---|---|
| JP | 2006-49657 | 2/2006 |
| JP | 2006-179494 | 7/2006 |
| JP | 2007-23267 | 2/2007 |
| JP | 2007-243135 | 9/2007 |

* cited by examiner

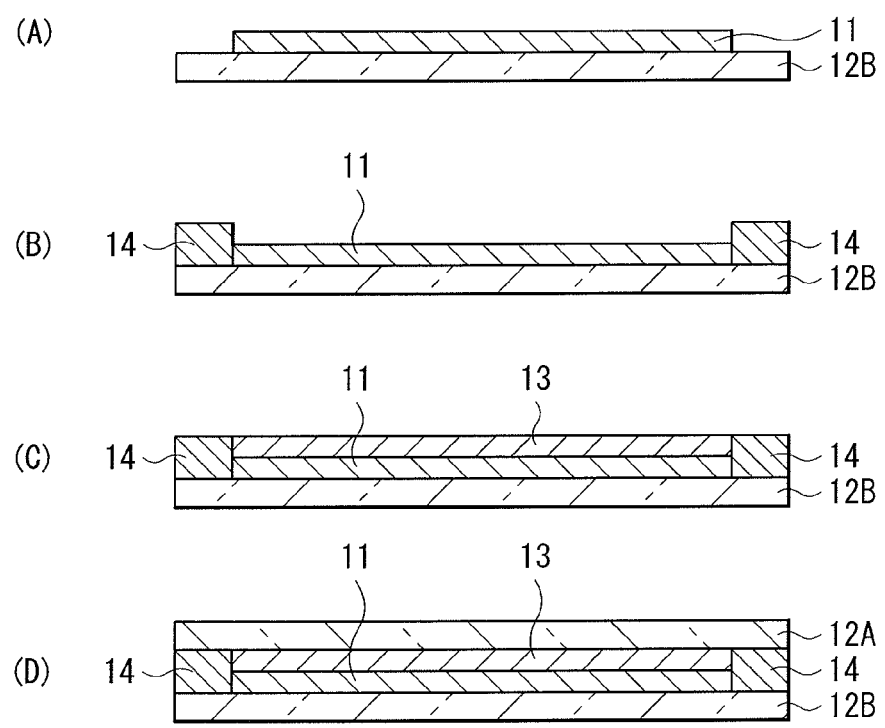
F I G. 6

LIGHT EMITTING DEVICE, DISPLAY DEVICE, AND COLOR CONVERSION SHEET

CROSS REFERENCE TO RELATED APPLICATIONS

The present application is a national stage of International Application No. PCT/JP2009/057843 filed on Apr. 20, 2009 and claims priority to Japanese Patent Applications Nos. 2008-115719 filed on Apr. 25, 2008 and 2009-031317 filed on Feb. 13, 2009 the disclosures of which are incorporated herein by reference.

BACKGROUND

The present invention relates to a light emitting device, for example, including a light source, and a color conversion layer which converts a color of light from the light source, a display device using the light emitting device, and a color conversion sheet.

From the past, a liquid crystal display (LCD; Liquid Crystal Display) has been used as a thin display device. A backlight irradiating the whole surface of a liquid crystal panel from behind is utilized in the liquid crystal display, and the liquid crystal display is roughly classified into the direct method and the edge light method, depending on the structure thereof. In the edge light system, surface emission is performed on the top face of a light guide plate by allowing light to enter from the side face of the light guide plate, and propagate inside the light guide plate. Also, in the direct system, the surface emission is performed by arranging a plurality of fluorescent lamps in parallel in the same plane. Today, the display has been progressively grown in size, and the direct method has become the mainstream for uniformly illuminating the whole panel having the large area with high luminance (for example, refer to Patent literature 1).

Meanwhile, in recent years, a backlight using a light emitting diode (LED: Light Emitting Diode) has attracted attention so as to realize further reduction in thickness and weight, long service life, and reduction in an environmental damage of the large display, and also from the viewpoint of improvement of moving image characteristics by blinking control. The following two methods are able to be used for irradiating white light to the panel with the backlight using such an LED.

In the first method, as illustrated in FIG. 21(A), LEDs 100R, 100B, and 100G having three colors of red (R: Red), blue (B: Blue) and green (G: Green) are used, and the white light is synthesized by simultaneously lighting these LEDs 100R, 100B, and 100G. On the other hand, in the second method, the blue LED is used as a light source, and a phosphor layer partly converting a color of light emitted from this blue LED is provided, and thereby the converted color light and blue light are mixed to emit the white light. For example, as illustrated in FIG. 21(B), the second method is realized by providing a flat-plate shaped phosphor layer 101 separately from the plurality of blue LEDs 100B which are arranged in the same plane. Alternatively, as illustrated in FIG. 21(C), the second method is realized by forming a phosphor layer 103 so as to cover a light emitting section 102 in the blue LED 100B in which the light emitting section 102 is connected to a cathode frame 105a and an anode frame 105b with a wire bond 104, and which is entirely sealed by an outer cap 107.

For example, in the case where a GaN blue LED chip is used as the above-described phosphor layer, epoxy resin, silicon resin, or the like in which a YAG phosphor is mixed is used. Thereby, the blue light from the blue LED chip is partly converted into yellow color light in the phosphor layer, and it is possible to obtain the white light as a whole (for example, refer to Patent literature 2). However, since the light emission spectrum is wide in the above-described YAG phosphor, in the case where the YAG phosphor is used for a backlight for a liquid crystal display, matching with a liquid crystal color filter is poor, and a color gamut is narrowed. Thus, by adding phosphors of other colors, such as red, or green and red, to the YAG phosphor, the color gamut is expanded, and the color reproducibility is improved.

However, since such a phosphor layer is sensitive to water vapor in air, and is deteriorated by being subjected to the water vapor, it is not possible to obtain a desirable light emission chromaticity and a desirable light emission efficiency.

Thus, the method in which the phosphor layer is formed on the face inside the outer cap of the blue LED chip, and the inside of the cap is evacuated, or filled with an inert gas atmosphere for hermetic sealing has been proposed (Patent literature 3). Also, the method in which the phosphor layer is sandwiched and sealed by two glass substrates has been proposed (Patent literature 4).

CITATION LIST

Patent Literature

Patent literature 1: Japanese Unexamined Patent Publication No. 2005-108635
Patent literature 2: Japanese Unexamined Patent Publication No. 2006-49657
Patent literature 3: Japanese Unexamined Patent Publication No. 2004-352928
Patent literature 4: Japanese Unexamined Patent Publication No. 2007-23267

SUMMARY

However, in the method of the Patent literature 3, since it is necessary to further adjust the internal atmosphere by applying the phosphor layer inside the outer cap, the manufacturing process is complicated. Also, application non-uniformity of the phosphor layer is likely to be generated, and there is a risk that the chromaticity is varied. On the other hand, in the method of the Patent literature 4, since the phosphor layer is in the flat-plate shape, it is possible to uniformly apply the phosphor layer with a simple process. However, the handling is poor in the heavy glass substrate, and it is difficult to cope with a large and thin display in particular.

In view of the foregoing, it is an object of the present invention to provide a color conversion sheet capable of suppressing deterioration of a color conversion layer which converts one color light into another color light, and realizing favorable handling, and a light emitting device using the light conversion sheet, and a display device.

A light emitting device of the present invention includes: a light source section; a color conversion layer converting at least a part of color light emitted from the light source section into another color light; and an impermeable sealing sheet sealing the color conversion layer.

A color conversion sheet of the present invention includes: a color conversion layer converting at least a part of color light emitted from a light source section into another color light; and an impermeable sealing sheet sealing the color conversion layer.

A display device of the present invention includes: a light source section; a display panel driven based on image data; a color conversion layer converting at least a part of color light emitted from the light source section into another color light and guiding to the display panel; and an impermeable sealing sheet sealing the color conversion layer.

In the light emitting device and the color conversion sheet, and the display device of the present invention, the part of the color light emitted from the light source section is converted into another color light by the color conversion layer, and surface emission is performed by color mixture of one and the other color light. By sealing such a color conversion layer by the impermeable sealing sheet, water is prevented from entering the color conversion layer.

According to the light emitting device and the color conversion sheet of the present invention, since the color conversion layer converting the part of the color light emitted from the light source section into another color light is sealed by the impermeable sealing sheet, it is possible to suppress deterioration of the color conversion layer. Also, it is possible to realize favorable handling in comparison with the case where the color conversion layer is sealed by a glass substrate.

Additional features and advantages of the present invention are described in, and will be apparent from, the following Detailed Description and the Figures.

FIGURES

FIG. 6 is a view for explaining the method of manufacturing the phosphor sheet according to a first modification.

DETAILED DESCRIPTION

Hereinafter, a description will be made in detail on an embodiment of the present invention with reference to the drawings.

Figure 1:
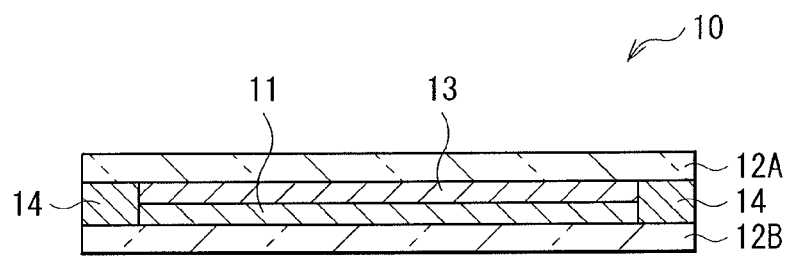
FIG. 1 is a cross-sectional view illustrating the schematic structure of a phosphor sheet according an embodiment of the present invention.

FIG. 1 illustrates the cross-sectional structure of a phosphor sheet (color conversion sheet) 10 according to an embodiment of the present invention. The phosphor sheet 10 is, for example, arranged immediately above a light source such as a blue LED and used, and is obtained by sealing a phosphor layer (color conversion layer) 11, which partly converts blue light from the light source into another color light, by a pair of sealing sheets 12A and 12B. By a first bonding layer 13 and a second bonding layer 14, the sealing sheets 12A and 12B are bonded with the phosphor layer 11 in between.

The phosphor layer 11 partly converts the incident color light into color light having a longer wavelength region. This phosphor layer 11 is, for example, contains at least one kind of fluorescent materials which emit green light, red light or yellow light by being excited by the blue light. Examples of the fluorescent material for yellow conversion include $(Y, Gd)_3(Al, Ga)_5O_{12}:Ce^{3+}$ (commonly called $YAG:Ce^{3+}$), and $\alpha\text{-SiAlON}:Eu^{2+}$. Examples of the fluorescent material for yellow or green conversion include $(Ca, Sr, Ba)_2SiO_4:Eu^{2+}$. Examples of the fluorescent material for green conversion include $SrGa_2S_4:Eu^{2+}$, $\beta\text{-SiAlON}:Eu^{2+}$, and $Ca_3Sc_2Si_3O_{12}:C^{3+}$. Examples of the fluorescent material for red conversion include $(Ca, Sr, Ba) S:Eu^{2+}$, $(Ca, Sr, Ba)_2Si_5N_8:Eu^{2+}$, and $CaAlSiN_3:Eu^{2+}$.

The sealing sheet 12A and 12B prevent an entry of water vapor into the phosphor layer 11, and are arranged so as to face each other on the light incidence side and the light emission side of the phosphor layer 11, respectively.

The structure of the sealing sheet 12A will be described with reference to FIG. 2. The sealing sheet 12A has a structure in which a water vapor barrier layer (impermeable layer) 122 is sandwiched between two resin sheets 121A and 121B. That is, the above-described phosphor layer 11 is sealed by the water vapor barrier layer 122 through the resin sheet 121A or the resin sheet 121B. As such resin sheets 121A and 121B, for example, thermoplastic resin, multifunctional acrylate, multifunctional polyolefin, unsaturated polyester, epoxy resin, and the like, such as polyethylene terephthalate (PET), polycarbonate (PC), polymethyl methacrylate (PMMA), polystyrene (PS), polyethylene naphthalate (PEN), polyether sulfone (PES), and cyclic amorphous polyolefin, may be used from the viewpoint of transparency, processability, heat resistance, and the like. In particular, materials which are less likely to be deteriorated by the blue LED or a near-ultraviolet LED, for example, polyethylene terephthalate, polycarbonate, polymethyl methacrylate, and polystyrene are preferably used. In addition, the same is true for the sealing sheet 12B.

The water vapor barrier layer 122 is composed of a single layer or a composite layer of a material having a low water vapor transmittance, for example, an inorganic material such as silicon oxide, silicon nitride, magnesium oxide (MgO), indium oxide, aluminum oxide ($Al_2O_3$), and tin oxide, and an organic material such as polyvinyl alcohol, ethylene vinyl alcohol copolymer, polyacrylonitrile, and polyvinylidene chloride. Also, the water vapor transmittance is, for example, preferably 2.0 $g/m^2/day$ or less. Further, in addition to the water vapor transmittance, a material having a low gas transmittance, such as oxygen, is preferably used.

The first bonding layer 13 is provided between the light emission face of the phosphor layer 11 and the sealing sheet 12A, and the second bonding layer 14 is provided in a frame shape along the outer circumference of the phosphor layer 11, that is, so as to surround the planar shape of the phosphor layer 11. Such first bonding layer 13 and second bonding layer 14 are composed of an adhesive material having water vapor barrier properties, for example, a UV curing adhesive, a thermoset adhesive, a bonding agent, and a hot-melt agent. However, since the first bonding layer 13 is arranged on an optical path of the light emitted from the phosphor layer 11, the first bonding layer 13 is composed of a material having transparency. Although the second bonding layer 14 may be transparent or opaque, it is preferable to use a material having high water vapor barrier properties.

Such a phosphor sheet 10 may be manufactured, for example, as will be described next.

Figure 2:
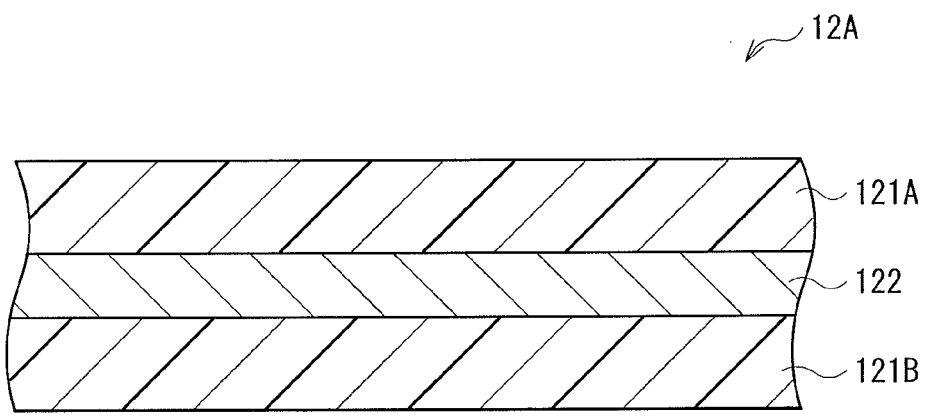
FIG. 2 is a cross-sectional view illustrating the schematic structure of a sealing sheet illustrated in FIG. 1.

First, the sealing sheets 12A and 12B having the structure as illustrated in FIG. 2 are fabricated. That is, on the resin sheet 121A made of the above-described material, the water vapor barrier layer 122 made of the above-described material is deposited through the use of various film-forming methods, for example, evaporation method and sputtering. In addition, in the case where an organic material is used for the water vapor barrier layer 122, the water vapor barrier layer 122 may be deposited through the use of coater coating, spray coating, or the like. Next, the other resin sheet 121B is overlaid on the formed water vapor barrier layer 122, and the water vapor barrier layer 122 is sealed between the resin sheets 121A and 121B.

Figure 3:
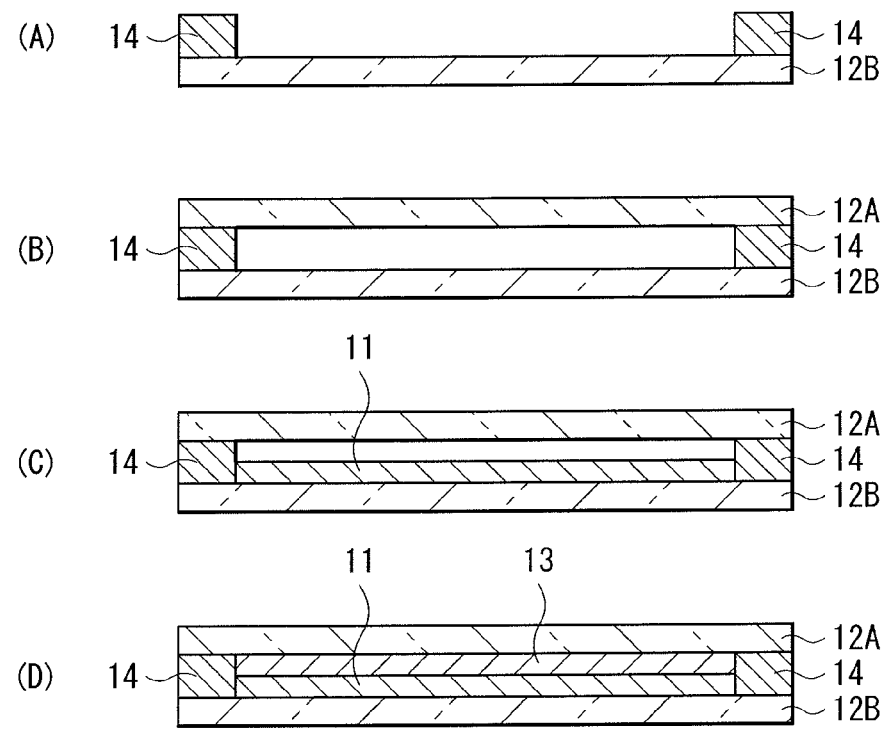
FIG. 3 is a view for explaining a method of manufacturing the phosphor sheet illustrated in FIG. 1.

Next, as illustrated in FIG. 3(A), in a periphery portion on the fabricated sealing sheet 12B, the second bonding layer 14 made of the above-described material is formed by coating. At this time, in the periphery portion of the sealing sheet 12B, a region where the second bonding layer 14 is not formed (it is not illustrated in the figure, and is called a gate section, hereinafter) is provided. Next, as illustrated in FIG. 3(B), the other sealing sheet 12A is overlaid and bonded onto the second bonding layer 14 so as to face the sealing sheet 12B. After this, as illustrated in FIG. 3(C), the phosphor layer 11 made of the above-described material is formed by coating on the surface of the sealing sheet 12B through the above-described gate section. Finally, as illustrated in FIG. 3(D), the first bonding layer 13 made of the above-described material is injected into a gap of the formed phosphor layer 11 and the sealing sheet 12A and bonded, and thereby the phosphor sheet 10 illustrated in FIG. 1 is completed.

Next, actions and effects of the phosphor sheet 10 of this embodiment will be described.

In the phosphor sheet 10, for example, when blue light enters from the lower side of the sealing sheet 12B, the part of this blue light is converted into light having another wavelength region, for example, red light and green light, in the phosphor layer 11, and emitted toward the upper side of the phosphor layer 11. Meanwhile, the other part of the blue light entered into the phosphor layer 11 is emitted without being converted in color. In this manner, each color light emitted from the phosphor layer 11 sequentially transmits the first bonding layer 13 and the sealing sheet 12A, and is emitted from the upper side of the sealing sheet 12A while being, for example, the white light by color mixture.

In this embodiment, by sealing the phosphor layer 11 as described above with the sealing sheets 12A and 12B having the water vapor barrier layer 122, the water vapor is prevented from entering the phosphor layer 11, and it is possible to suppress deterioration of characteristics such as the light emission efficiency. In particular, this is effective in the case where a sulfide-based or oxysulfide-based fluorescent material which is weak to the water vapor is used as the phosphor layer 11.

Figure 4:
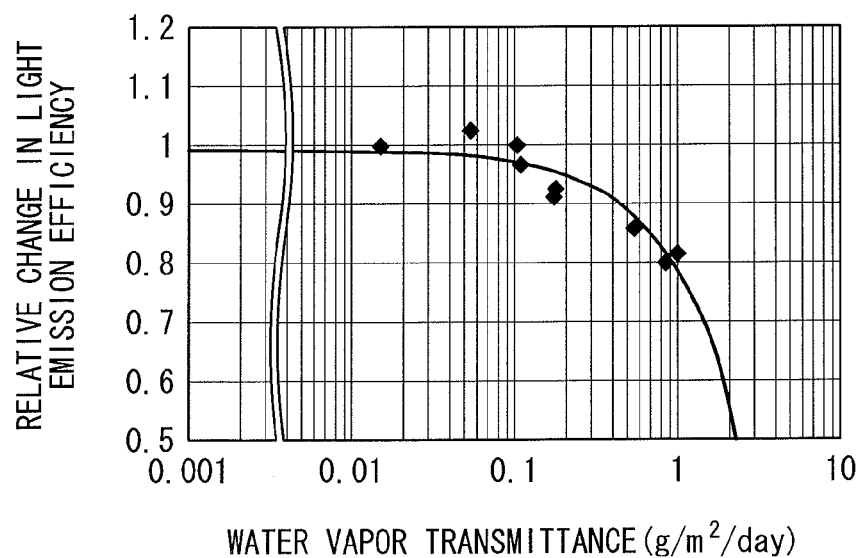
FIG. 4 is a view illustrating a change of a light emission efficiency of the phosphor layer to the water vapor transmittance of a water vapor barrier layer illustrated in FIG. 2.

In FIG. 4, a change of the light emission efficiency of the phosphor layer 11 to the water vapor transmittance of the water vapor barrier layer 122 is illustrated. The phosphor sheet 10 is fabricated by using a phosphor material which is generally regarded as weak to the water vapor, and the change of the light emission efficiency of the phosphor layer 11 is investigated while the phosphor sheet 10 is left under the environment of 85° C. and 90% RH for 500 hours. However, the relative change by regarding the initial light emission efficiency as 1 is illustrated. In this manner, it can be seen that the reduction of the light emission efficiency is remarkable as the water vapor transmittance is high, that is, the water vapor barrier properties are low. Therefore, in the case where the phosphor layer 11 is sealed by the sealing sheets 12A and 12B having the water vapor barrier layer 122, it is possible to reduce deterioration of the phosphor layer 11 in accordance with the barrier properties of the water vapor barrier layer 122.

The acceleration coefficient under the environment as described above is generally regarded as 70 or more, and corresponds to the deterioration in the case of the use for 35000 hours or more in the actual environment. Also, in a typical backlight, the condition to assure the reliability is that the time which is necessary for luminance reduction by half is 30000 hours or more. Therefore, when the water vapor transmittance is 2 $g/m^2/day$ or less, it is possible to exceed the reliability condition as described above.

However, although this water vapor barrier layer 122 prevents the entry of the water vapor into the phosphor layer 11, since the chemical reaction is likely to be generated with the phosphor layer 11, the phosphor layer 11 is deteriorated by this chemical reaction, and there is a risk that the characteristics such as the light emission efficiency are deteriorated.

In this embodiment, the phosphor layer 11 is sealed by the sealing sheet 12A and 12B including the water vapor barrier layer 122 through the resin sheet 121A or the resin sheet 121B, and thereby the phosphor layer 11 and the water vapor barrier layer 122 are not in direct contact. Therefore, the chemical reaction is less likely to be generated between the phosphor layer 11 and the water vapor barrier layer 122.

Also, in the sealing sheets 12A and 12B, by sandwiching the water vapor barrier layer 122 by the two resin sheets 121A and 121B, the water vapor barrier layer 122 is not subjected to outside, and this leads to assurance of weather resistance and prevention of a mechanical damage in the water vapor barrier layer 122. Also, thereby, the state of the surface of the water vapor barrier layer 122 becomes favorable, the range of selections of the printing process and the material of the bonding layer of the phosphor layer 11 is expanded, and the manufacturability is improved.

As described above, in this embodiment, by the phosphor layer 11, the part of the blue light from the light source is converted into another color light and emitted, and the other part of the blue light is emitted without being converted in color, and thereby it is possible to obtain, for example, the white color by color mixture of each color light. Since this phosphor layer 11 is sealed by the sealing sheets 12A and 12B, and the sealing sheets 12A and 12B have the resin sheet 121A (or the resin sheet 121B) and the water vapor barrier layer 122 from the phosphor layer 11 side, respectively, it is possible to suppress deterioration of the phosphor layer 11. Also, it is possible to realize favorable handling at a low cost in comparison with the case where the phosphor layer is sealed by a glass substrate. Thereby, it is possible to easily cope with large-size and thinning of the display.

APPLICATION EXAMPLES

Figure 5:
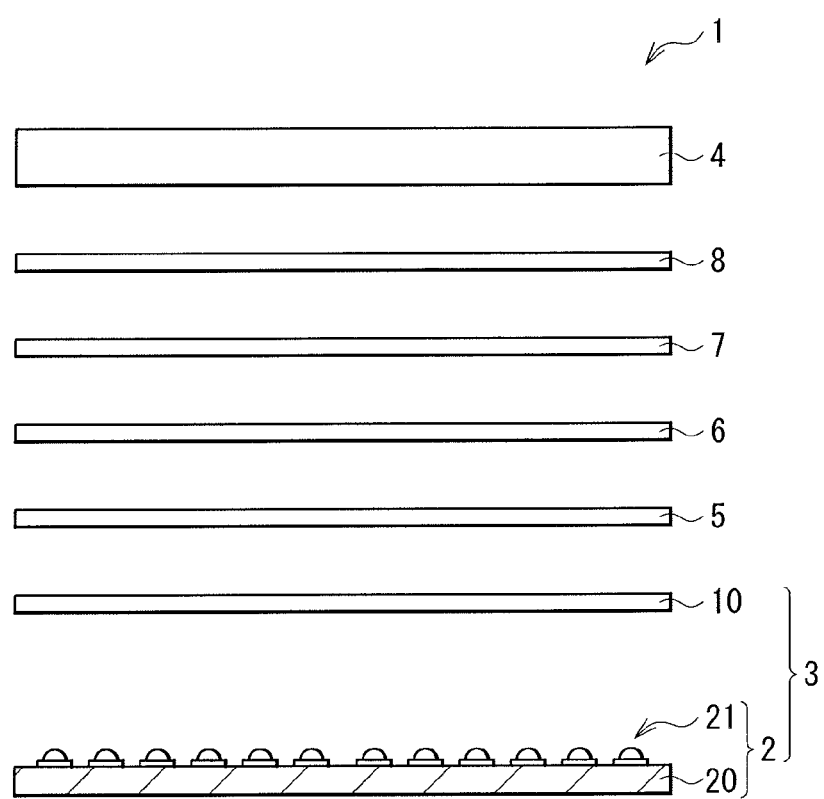
FIG. 5 is a cross-sectional view illustrating the schematic structure of a display device (light emitting device) according to an application example of the phosphor sheet illustrated in FIG. 1.

The phosphor sheet 10 as described above is, for example, applicable to a display device 1 (a light emitting device 3) as illustrated in FIG. 5.

The display device 1 includes the light emitting device 3 as a backlight composed of a light source section 2 and the phosphor sheet 10, and a display panel 4 driven based on image data. Between the light emitting device 3 and the display panel 4, various optical function films such as a diffusion plate 5, a diffusion film 6, a lens film (light condensing member) 7, and a reflective polarizing film 8 are sequentially arranged from the light emitting device 3 side.

The light source section 2 in which a plurality of blue LEDs 21 are arranged on a substrate 20 performs surface emission as a whole. The phosphor sheet 10 is arranged immediately above such a light source section 2.

In the display panel 4, for example, a liquid crystal layer is sealed between a TFT substrate in which a pixel electrode, a TFT (Thin Film Transistor) element, and the like are formed, and a facing substrate in which a facing electrode, a color filter, and the like are formed (all not illustrated in the figure). Onto the light incidence side and the light emission side of this display panel 4, polarizing plates (not illustrated in the figure) are bonded so that polarizing axes are orthogonal to each other, respectively.

The diffusion plate 5 and the diffusion film 6 are intended to uniformize the intensity distribution by diffusing the incident light, and correspond to the light diffusion member of the present invention. The lens film 7 is formed by aligning a plurality of prismatic projections in parallel, and has a function to condense the incident light. The reflective polarizing film 8 is intended to transmit one polarized light, and to reflect the other polarized light at the lower side (the light emitting device 3 side) to utilize it in recycle, and is provided to improve the light use efficiency.

In this display device 1, the blue light emitted from the blue LED 21 is emitted as the white light by the phosphor sheet 10, as described above. After the white light emitted from the light emitting device 3 is diffused by the diffusion plate 5, and the diffusion film 6, the white light is condensed by the lens film 7, and transmits the reflective polarizing film 8 to irradiate the display panel 4. The light irradiated in this manner is modulated based on the image data by the display panel 4, and the image is displayed.

Next, modifications of the foregoing embodiment will be described. In addition, hereinafter, same reference numerals are used for components identical to those in the foregoing embodiment, and thereby the description is appropriately omitted.

(Modification 1)

FIG. 6(A) to 6(D) illustrate the method of manufacturing the phosphor sheet 10 according to a modification 1 in the process order. The phosphor sheet 10 may be manufactured as will be described next. First, as illustrated in FIG. 6(A), the phosphor layer 11 is formed by coating in a region other than the periphery portion on the sealing sheet 12B. Next, as illustrated in FIG. 6(B), the second bonding layer 14 is formed in the periphery portion on the sealing sheet 12B, that is, so as to surround the planar shape of the phosphor layer 11. After this, as illustrated in FIG. 6(C), the first bonding layer 13 is formed so as to cover the whole surface of the phosphor layer 11. Onto the first bonding layer 13, the sealing sheet 12A is bonded as illustrated in FIG. 6(D), and thereby the phosphor sheet 10 is completed.

(Modification 2)

Figure 7:
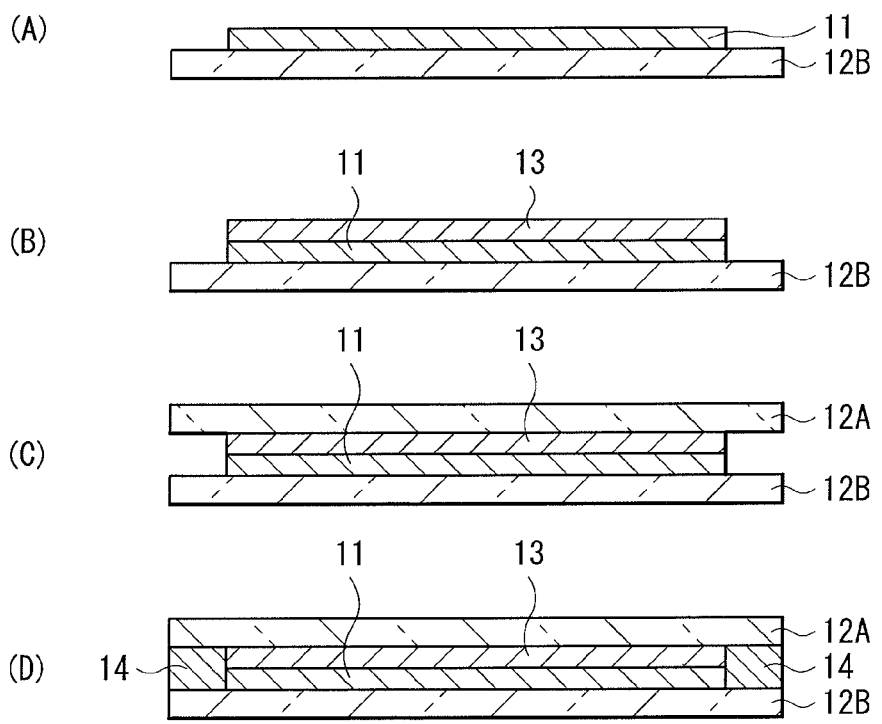
FIG. 7 is a view for explaining the method of manufacturing the phosphor sheet according to a second modification.

FIGS. 7(A) to 7(D) illustrate the method of manufacturing the phosphor sheet 10 according to a modification 2 in the process order. The phosphor sheet 10 may be manufactured as will be described next. First, as illustrated in FIG. 7(A), the phosphor layer 11 is formed by coating in a region other than the periphery portion on the sealing sheet 12B. Next, as illustrated in FIG. 7(B), the first bonding layer 13 is formed so as to cover the whole surface on the light emission side of the phosphor layer 11. Next, as illustrated in FIG. 7(C), the sealing sheet 12A is bonded onto the first bonding layer 13. Finally, as illustrated in FIG. 7(D), the second bonding layer 14 is formed so as to seal the gap between the sealing sheet 12A and the sealing sheet 12B from the outer side, and thereby the phosphor sheet 10 is completed.

(Modification 3)

Figure 8:
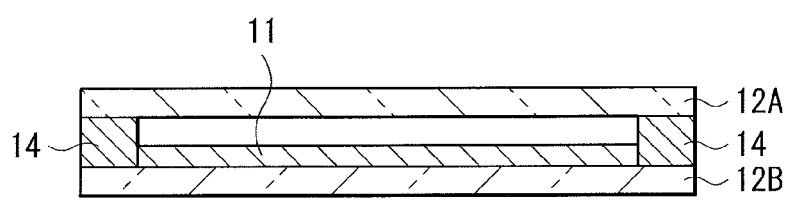
FIG. 8 is a cross-sectional view illustrating the schematic structure of the phosphor sheet according to a third modification.

FIG. 8 illustrates the cross-sectional structure of the phosphor sheet according to a modification 3. The phosphor sheet of the modification 3 has the same structure as that described in the foregoing embodiment except that the first bonding layer 13 is not provided, and the phosphor layer is hermetically sealed between the sealing sheets 12A and 12B only by the second bonding layer 14. In this manner, when air-tightness between the sealing sheets 12A and 12B is maintained by the second bonding layer 14, it is not always necessary to bond one sealing sheet 12A and the phosphor layer 11. Thereby, it is possible to realize low cost and simplification of the manufacture process.

(Modification 4)

Figure 9:
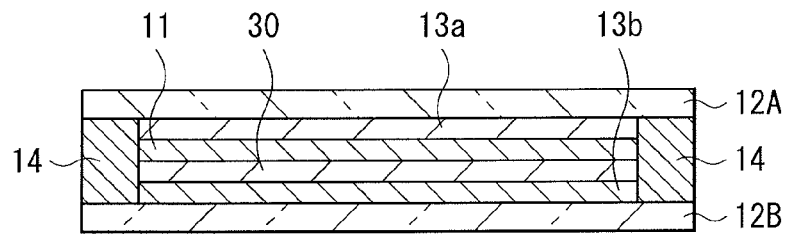
FIG. 9 is a cross-sectional view illustrating the schematic structure of the phosphor sheet according to a fourth modification.

FIG. 9 illustrates the cross-sectional structure of the phosphor sheet according to a modification 4. The phosphor sheet of the modification 4 has the same structure as that described in the foregoing embodiment except that the phosphor layer 11 is formed on a base film 30, a first bonding layer 13*a* is provided between the phosphor layer 11 and the sealing sheet 12A, and a first bonding layer 13*b* is provided between the base film 30 and the sealing sheet 12B. The base film 30 is, for example, composed of polyethylene terephthalate or the like. The first bonding layers 13*a* and 13*b* are composed of the same material as the first bonding layer 13 of the foregoing embodiment. In this manner, by forming the phosphor layer 11 on the base film 30, it is possible to prevent warpage of the phosphor layer 11, and the application process of the phosphor layer 11 is simplified.

(Modification 5)

Figure 10:
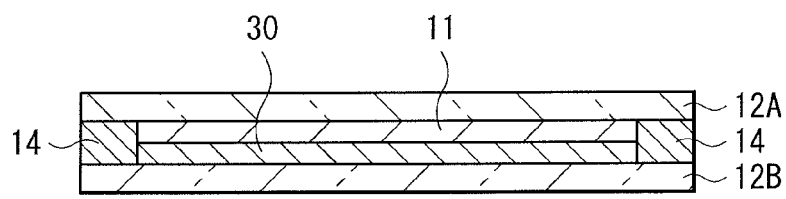
FIG. 10 is a cross-sectional view illustrating the schematic structure of the phosphor sheet according to a fifth modification.

FIG. 10 illustrates the cross-sectional structure of the phosphor sheet according to a modification 5. The phosphor sheet of the modification 5 has the same structure as the phosphor sheet according to the foregoing modification 4 except that the first bonding layers 13a and 13b are not provided, and the phosphor sheet is hermetically sealed only by the second bonding layer 14. In this manner, when the air-tightness between the sealing sheets 12A and 12B is maintained by the second bonding layer 14, it is not always necessary to bond the sealing sheet 12A and the phosphor layer 11, and bond the sealing sheet 12B and the base film 30, respectively.

(Modification 6)

Figure 11:
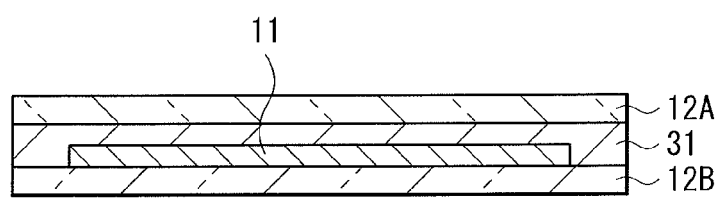
FIG. 11 is a cross-sectional view illustrating the schematic structure of the phosphor sheet according to a sixth modification.

FIG. 11 illustrates the cross-sectional structure of the phosphor sheet according to a modification 6. The phosphor sheet of the modification 6 has the structure in which a bonding layer 31 is provided so as to cover the whole phosphor layer 11 arranged on the sealing sheet 12B, and the phosphor layer 11 is hermetically sealed between the sealing sheets 12A and 12B only by the bonding layer 31. Although the bonding layer 31 is composed of the same material as the first bonding layer 13 of the foregoing embodiment, the bonding layer 31 preferably has the sufficient water vapor barrier properties.

Figure 12:
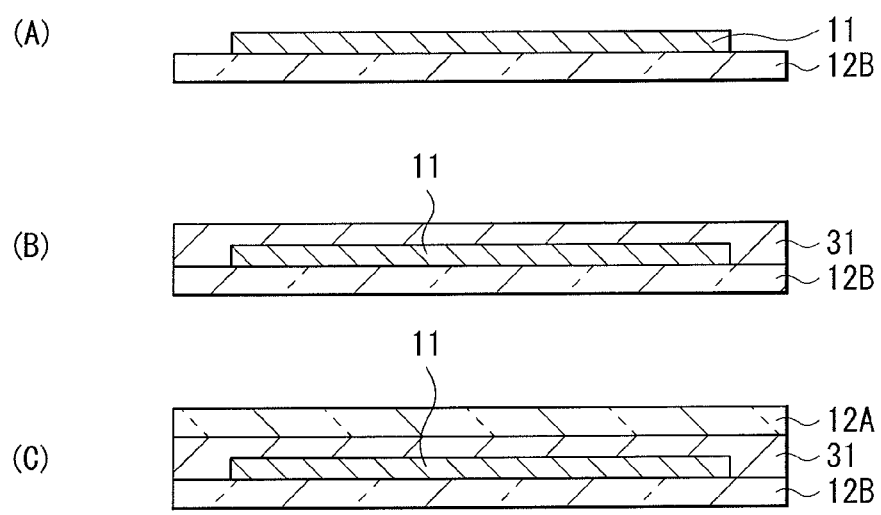
FIG. 12 is a view for explaining a method of manufacturing the phosphor sheet illustrated in FIG. 11.

Such a phosphor sheet may be manufactured, for example, as will be described next. First, as illustrated in FIG. 12(A), the phosphor layer 11 is formed by coating in the region other than the periphery portion on the sealing sheet 12B. Next, as illustrated in FIG. 12(B), the bonding layer 31 is formed so as to cover the formed phosphor layer 11 and the periphery portion of the sealing sheet 12B. Finally, as illustrated in FIG. 12(C), by bonding the sealing sheet 12A onto the formed bonding layer 31, the phosphor sheet as illustrated in FIG. 11 is completed.

Similar to the modification 6, the bonding layer 31 may be continuously formed over the whole surface of the sealing sheets 12A and 12B. Thereby, the manufacture process is simplified.

Figure 13:
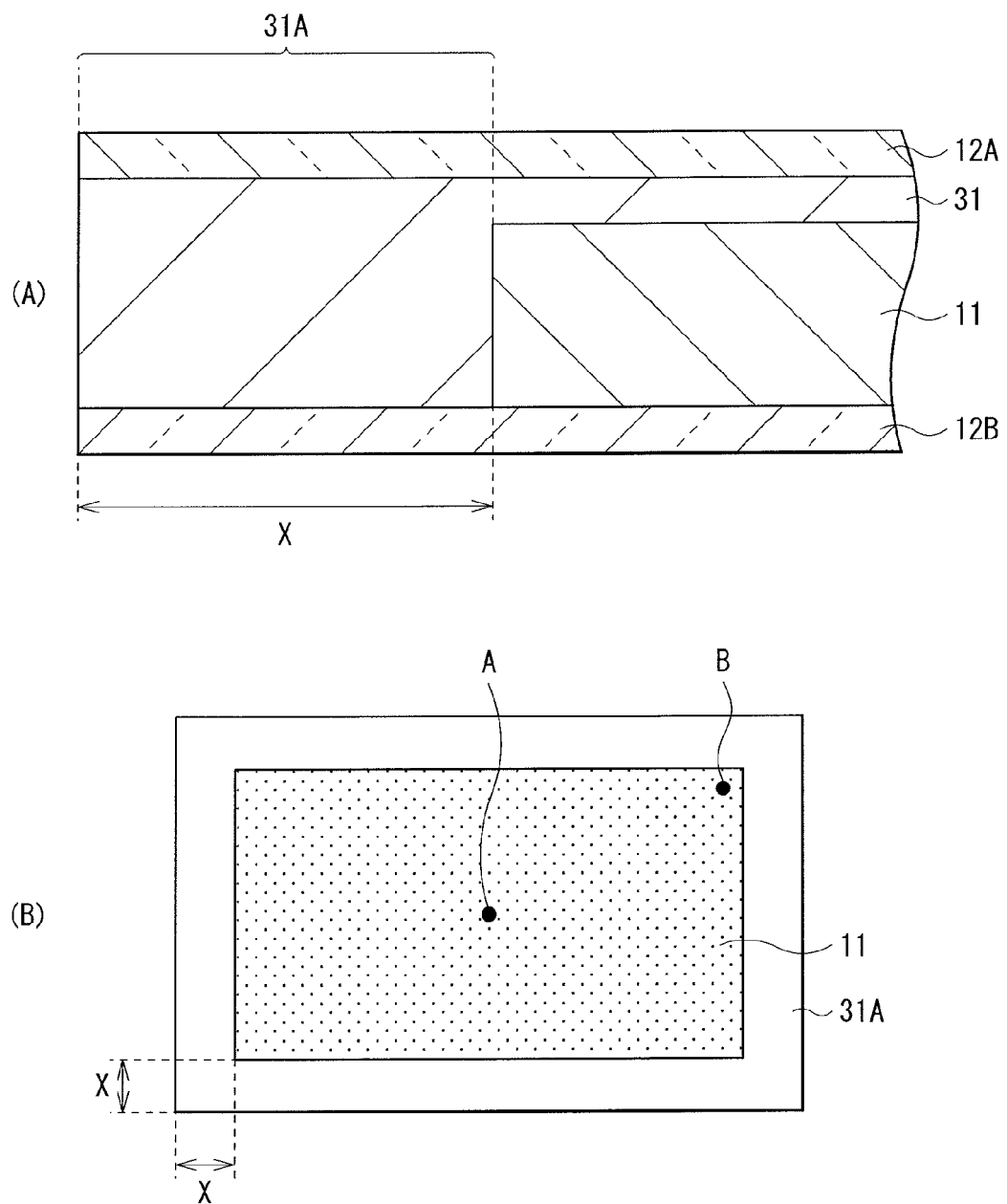
FIG. 13(A) is an enlarged cross-sectional view and FIG. 13(B) is a top face view, each illustrating an edge seal portion of the phosphor sheet illustrated in FIG. 11.

FIG. 13(A) illustrates the vicinity of an edge seal portion 31A of the bonding layer 31 in an enlarged manner, and FIG. 13(B) illustrates the phosphor layer 11 and the edge seal portion 31A as viewed from the top face, respectively. As illustrated in FIGS. 13(A) and 13(B), in this modification, the periphery portion (edge seal portion 31A) of the bonding layer 31 protects the phosphor layer 11 from the side face. Although the deterioration of the phosphor layer 11 is progressed mainly by the entry of the oxygen or the like from the top face and the bottom face of the phosphor layer 11, in addition to the top face and the bottom face, the entry from the side face is also unignorable in the vicinity of the side face of the phosphor layer 11. In particular, the edge seal portion 31A contributes to suppress such deterioration caused by the entry of the oxygen or the like from the side face of the phosphor layer 11.

Figure 14:
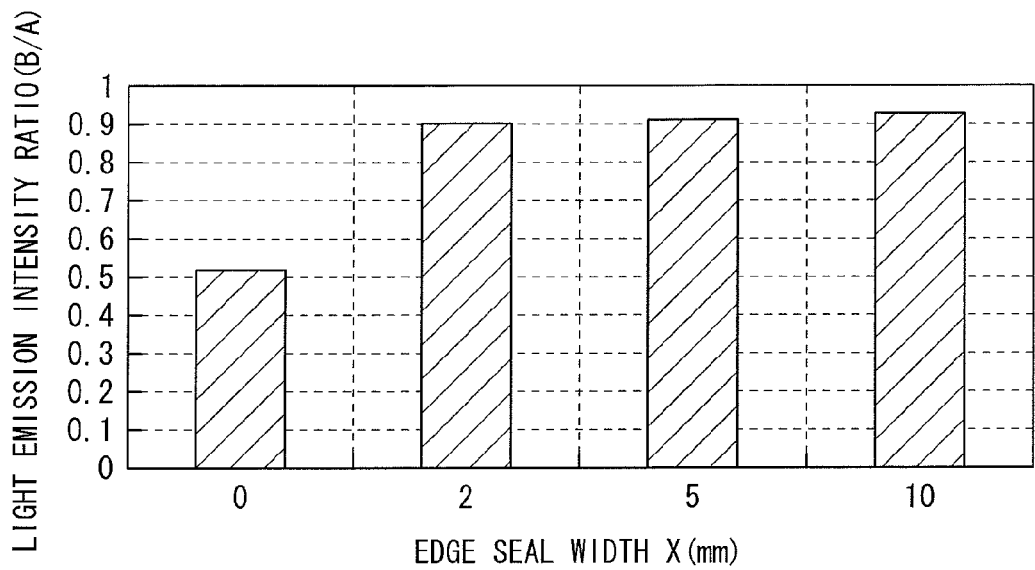
FIG. 14 is a view illustrating a light emission intensity ratio to an edge seal width of the phosphor sheet illustrated in FIG. 11.

Thus, the experiment in which the deterioration degree of the phosphor layer 11 was investigated by changing the width of the edge seal portion 31A (edge seal width X) as described above was conducted. Specifically, in each of the cases where X=0, 2, 5, and 10 mm, the light emission intensity was measured in the vicinity of the middle (measurement point A in FIG. 13(B)), and in the vicinity of the end portion (measurement point B in FIG. 13(B)) in the plane of the phosphor layer 11, respectively. However, a phosphor (excitation light: blue light) for red conversion which was regarded that the luminance deterioration was generally large under high-temperature and high-humidity was used as the phosphor, and sheets having the water vapor transmittance of 0.01 g/m$^2$/day were used as the sealing sheets 12A and 12B. An acrylic resin-based adhesive was used as the bonding layer 31, and the thickness thereof was set to be 10 μm. The phosphor sheet fabricated by using these materials was left under the environment of 80° C. and 90% RH, and the light emission intensity was measured after the passage of 300 hours. In FIG. 14, the light emission intensity ratio (the light emission intensity of the measurement point B/the light emission intensity of the measurement point A) in each width X was illustrated.

As illustrated in FIG. 14, in the case where the width X of the edge seal portion 31A=0 mm, that is, in the case where the side face of the phosphor layer 11 is bared, the light emission intensity in the measurement point B is reduced by half in comparison with that of the measurement point A. Meanwhile, in the case where X=2, 5, or 10 mm, the difference was hardly observed between the measurement point A and the measurement point B. That is, when the width of the edge seal portion 31A is 2 mm or more, it can be seen that the entry of the oxygen, the water vapor, and the like from the side face is effectively controllable. However, the width of the edge seal portion 31A is not limited to 2 mm or more. This is because it is possible to obtain the same effect as described above even in the case where the width of the edge seal portion 31A is less than 2 mm, depending on a combination of the used phosphor and the materials of the bonding layer, or the like.

(Modification 7)

Figure 15:
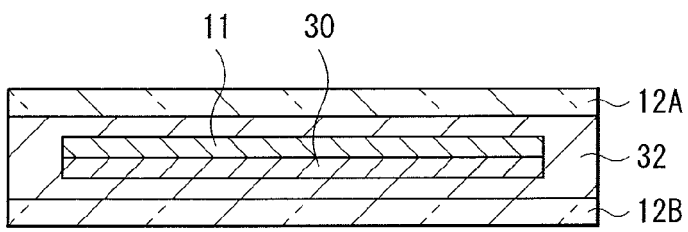
FIG. 15 is a cross-sectional view illustrating the schematic structure of the phosphor sheet according to a seventh modification.

FIG. 15 illustrates the cross-sectional structure of the phosphor sheet according to a modification 7. In the phosphor sheet of the modification 7, the phosphor layer 11 is formed on the base film 30 of the foregoing modifications 4 and 5, and the whole of the phosphor layer 11, and the base film 30 is surrounded by the sealing layer 32, and hermetically sealed between the sealing sheets 12A and 12B. The bonding layer 32 is composed of the same material as the bonding layer 31 of the foregoing modification 6. In this manner, the whole base film 30 on which the phosphor layer 11 is formed may be sealed between the sealing sheets 12A and 12B by the bonding layer 32.

(Modification 8)

Figure 16:
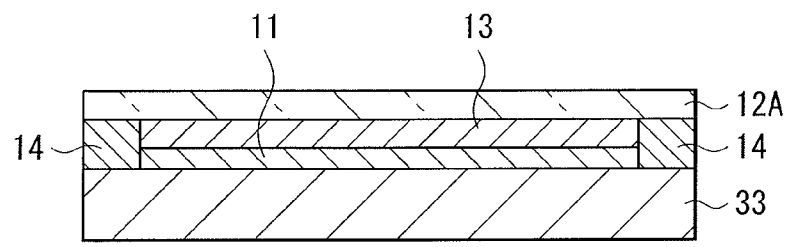
FIG. 16 is a cross-sectional view illustrating the schematic structure of the phosphor sheet according to an eighth modification.

FIG. 16 illustrates the cross-sectional structure of the phosphor sheet according to a modification 8. The phosphor sheet of the modification 8 has the same structure as the phosphor sheet 10 of the foregoing embodiment except that an optical function layer 33 is arranged in substitution for the other sealing sheet 12B. The optical function layer 33 is an optical film of various types such as the diffusion plate 5, the diffusion film 6, the lens film 7, the reflective polarizing film 8, and the like. In this modification, the phosphor layer 11 is formed on one face of such an optical function layer 33, and the sealing sheet 12A is bonded onto the phosphor layer 11 by the first bonding layer 13 and the second bonding layer 14. However, in this case, the optical function layer 33 preferably has the sufficient water vapor barrier properties. By using such a phosphor sheet, it is advantageous for thinning of the light emitting device or the display device.

(Modification 19)

Figure 17:
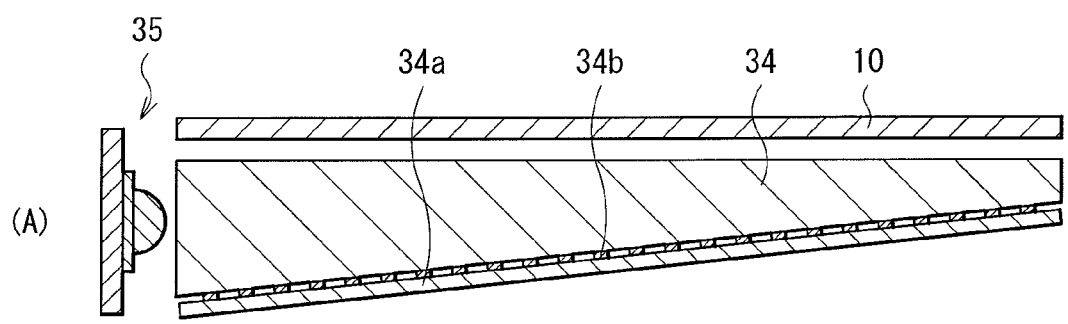
FIG. 17 is a cross-sectional view illustrating the schematic configuration of a light emitting device according to a ninth modification.
Figure 17:
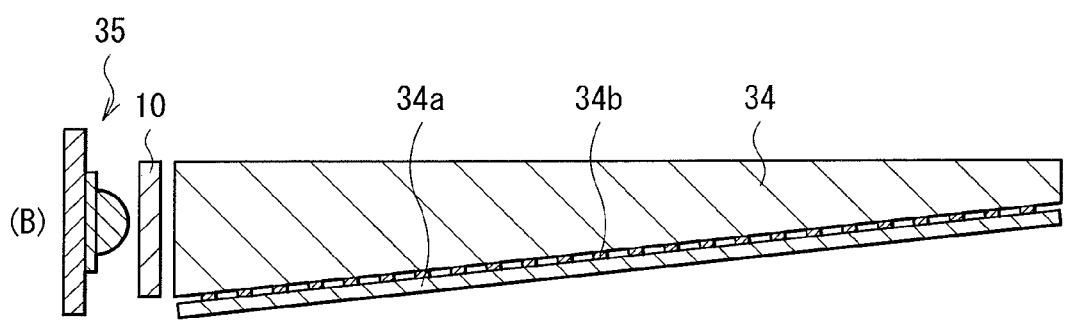

FIGS. 17(A) and 17(B) illustrate the cross-sectional structure of the light emitting device according to a modification 9. In the light emitting device of the modification 9, a light guide plate 34 propagating the light from the blue LED 35 which is provided on the side face, and performing the surface emission toward the upper side is used as a light source section. A light reflective member 34a and a light diffusion member 34b are provided on the bottom face of the light guide plate 34. In this manner, the light source of the phosphor sheet 10 is not limited to the light source in which the plurality of blue LEDs are arranged on the substrate as described above, but may be the light source using the light guide plate 34 as in this modification. Also, in this case, the phosphor sheet 10 may be arranged so as to oppose to the face on the light emission side of the light guide plate 34 as illustrated in FIG. 17(A), or may be arranged so as to oppose to the face on the light incidence side of the light guide plate 34 as illustrated in FIG. 17(B).

Also in this modification, similar to the foregoing modification 8, the phosphor layer is formed on the light incidence face or the light emission face of the light guide plate 34, and the top face of the phosphor layer may be covered with the sealing sheet. Also, the phosphor sheet 10 may be arranged on the bottom face side of the light guide plate 34.

Figure 18:
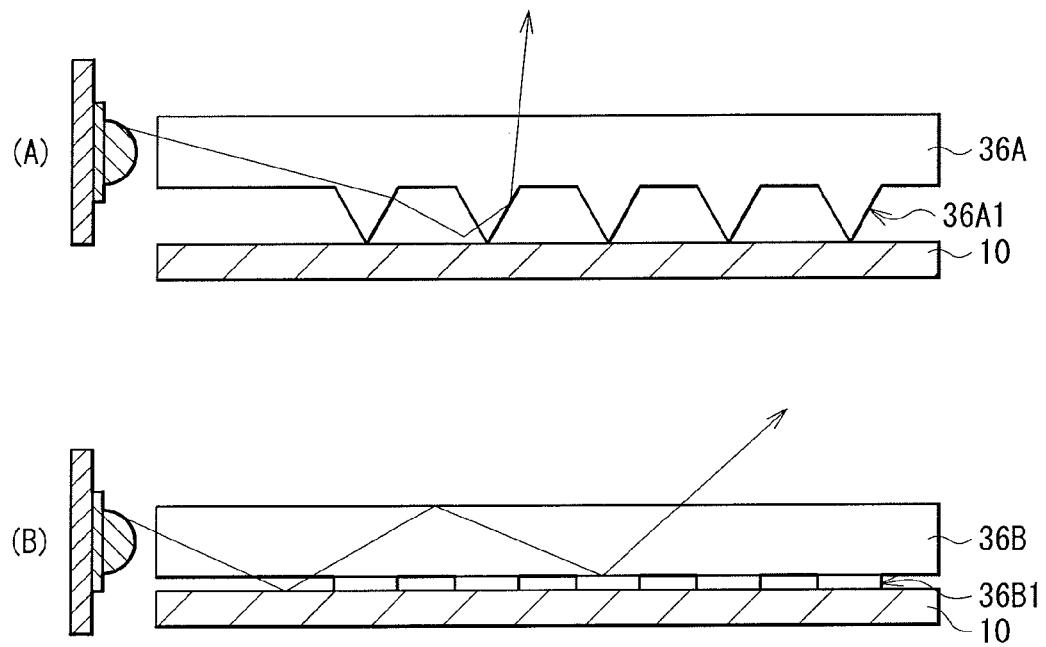
FIG. 18 is a cross-sectional view illustrating the schematic configuration of another example of the light emitting device illustrated in FIG. 17.

FIG. 18(A) illustrates the specific structure of the case where the phosphor sheet is arranged on the bottom face side of the light guide plate. As illustrated in FIG. 18(A), for example, a plurality of grooves 36A1 processed for the light extraction are formed on the bottom face of the light guide plate 36A, and the phosphor sheet 10 is arranged below the plurality of grooves 36A1. In the light guide plate 36A, total reflection conditions in the light propagating inside the light guide plate 36A are broken by the grooves 36A1 (becomes smaller than the critical angle), and thereby the light is emitted toward the upper side of the light guide plate 36A. When the total reflection conditions are broken in the groove 36A1, the blue light transmits the phosphor sheet 10, and is converted in color. In addition, the process for the light extraction in the light guide plate 36A is not limited to the groove 36A1 as described above. For example, as illustrated in FIG. 18(B), a light guide plate 36B in which a plurality of dots 36B1 are printed on the bottom face thereof may be used.

(Modification 10)

Figure 19:
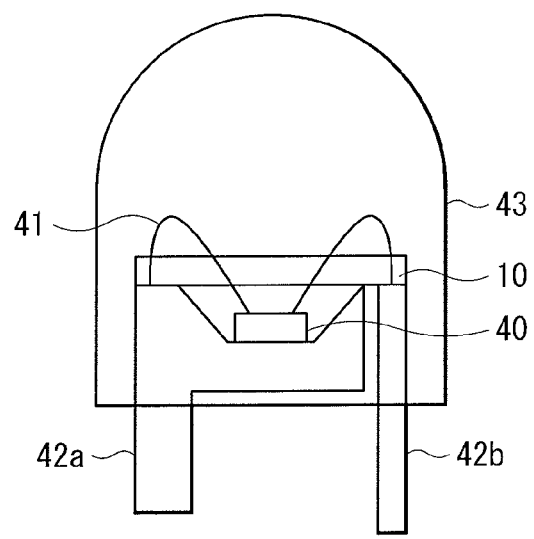
FIG. 19 is a cross-sectional view illustrating the schematic configuration of the light emitting device according to a tenth modification.

FIG. 19 illustrates the schematic structure of the light emitting device according to a modification 10. The light emitting device of the modification 10 is, for example, the blue LED, and is obtained by arranging the phosphor sheet 10 immediately above a light emitting section 40. The light emitting section 40 is electrically connected to an anode frame 42a and a cathode frame 42b by a wire bond 41. The light emitting section 40 and the phosphor sheet 10 are sealed by an outer cap 43. In this manner, the phosphor sheet 10 may be arranged immediately above the light emitting section 40 of the blue LED.

(Modification 11)

Figure 20:
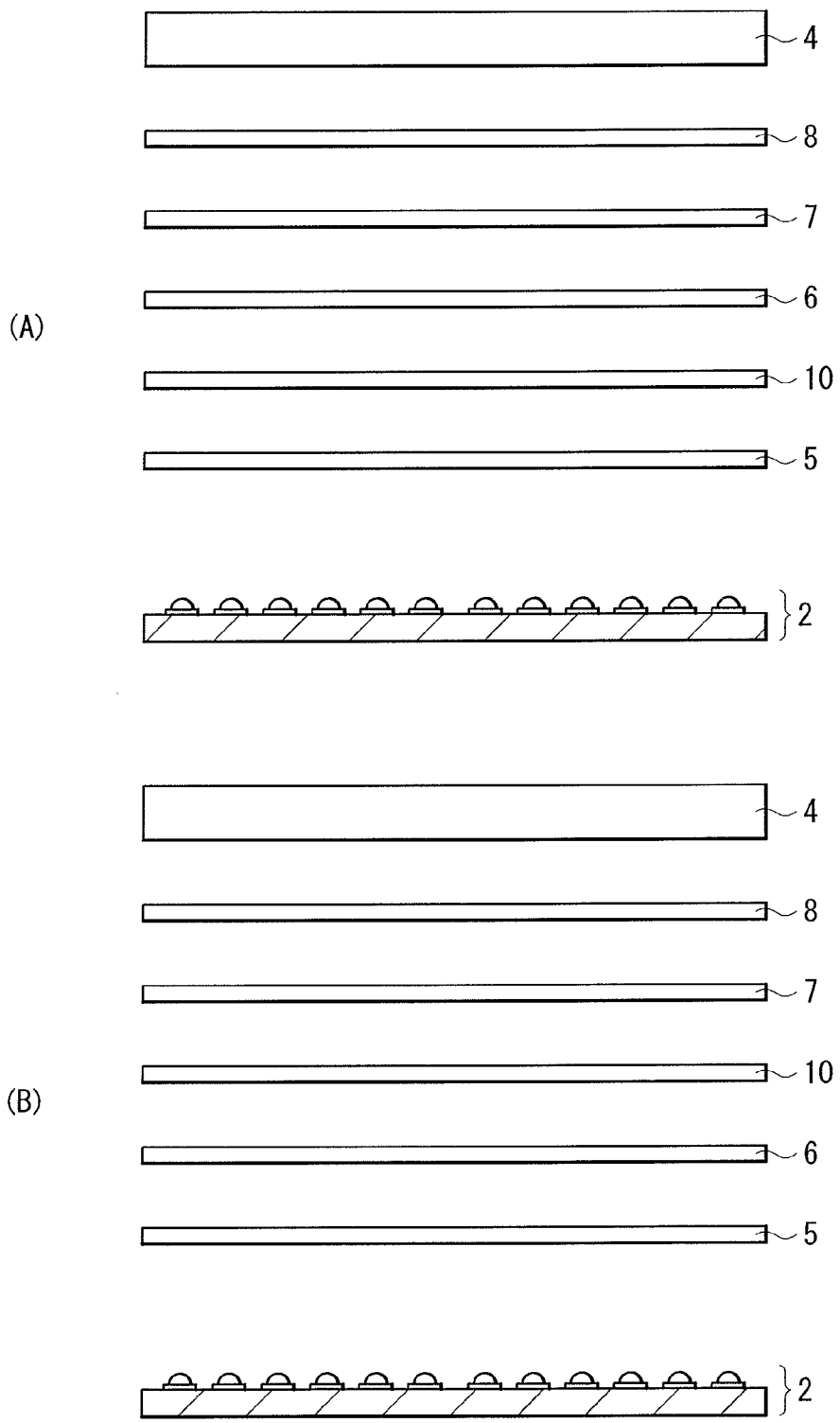
FIG. 20 is a cross-sectional view illustrating the schematic configuration of a display device according to an eleventh modification.
Figure 21:
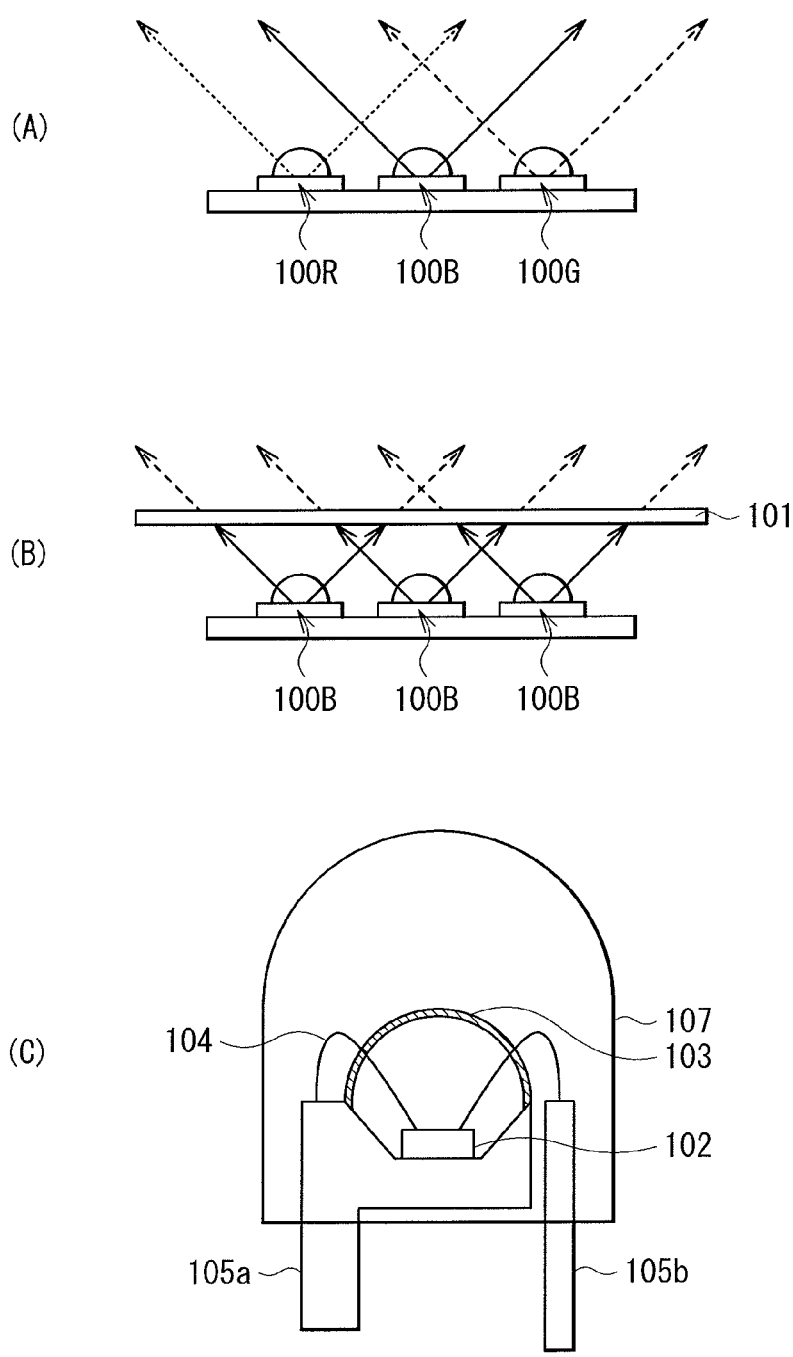
FIG. 21 is a cross-sectional view illustrating the schematic configuration of a light emitting device according to an example of the related art.

FIGS. 20(A) and 20(B) illustrate the cross-sectional structure of the display device according to a modification 11. In the display device according to the modification 11, the position where the phosphor sheet 10 is installed is different from that of the phosphor sheet 10 of the display device 1 of the foregoing embodiment. That is, the phosphor sheet 10 is provided between the diffusion plate 5 and the diffusion film 6 (FIG. 20(A)), or between the diffusion film 6 and the lens film 7 (FIG. 20(B)). In this manner, the phosphor sheet 10 is not limitedly arranged immediately above the light source section 2, but may be arranged in any position between the light source section 2 and the reflective polarizing film 8. However, to minimize the viewing angle dependency in the chromaticity of the light emitted from the phosphor sheet 10, it is good to arrange the phosphor sheet 10 immediately above the light source section 2 as illustrated in FIG. 5, or between the diffusion plate 5 and the diffusion film 6 as illustrated in FIG. 20(A). Meanwhile, to minimize the radiation angle dependency in the chromaticity of the light emitted from the LED light source, it is good to arrange the phosphor layer 10 by the arrangement of FIG. 20(A), or between the diffusion film 6 and the lens film 7 as illustrated in FIG. 20(B). Thus, the arrangement of FIG. 20(A) which may minimize both of the viewing angle dependency in the chromaticity of the emitted light, and the radiation angle dependency in the chromaticity of the light emited from the light source is preferable.

Hereinbefore, although the description has been made on the embodiment of the present invention, the present invention is not limited to the embodiment and the like, and various modifications are possible. For example, although the description has been made with the example of the structure in which the blue LED is used as the light source, it is not limited to this, but a light source emitting color light having a relatively short wavelength region, for example, a near-ultraviolet LED may be used. In this case, for the color conversion layer, $(Ca, Sr, Ba)_2SiO_4:Eu^{2+}$, $BAM:Eu^{2+}$, $Mn^{2+}$, $\alpha$-SiAlON: $Eu^{2+}$, and the like may be used as the fluorescent material for green conversion or yellow conversion. Also, $Y_2O_2S:Eu^{3+}$, $La_2O_2S:Eu^{3+}$, $(Ca, Sr, Ba)_2Si_5N_8:Eu^{2+}$, $CaAlSiN_3:Eu^{2+}$, $LiEuW_2O_8$, $Ca(Eu, La)_4Si_3O_{13}$, $Eu_2W_2O_9$ base, $(La, Eu)_2W_3O_{12}$, $(Ca, Sr, Ba)_3MgSi_2O_8:Eu^{2+}$, $Mn^{2+}$, $CaTiO_3:Pr^{3+}, Bi^{3+}$, and the like may be used as the fluorescent material for red conversion. Also, $BAM:Eu^{2+}$, $(Ca, Sr, Ba)_5(PO_4)_3Cl:Eu^{2+}$, and the like may be used as the fluorescent material for blue conversion. However, it is preferable to use the blue LED from the viewpoint of the light emission efficiency and the weather resistance.

Also, in the foregoing embodiment, as the light emitting device, although the description has been made with the example of the structure composed of the light source section 2 and the phosphor sheet 10, it is not limited to this, and, for example, the other optical function layer, for example, the diffusion plate 5, the diffusion film 6, the lens film 7, and the reflective polarizing film 8, and the like as described above may be provided on the light emission side of the phosphor sheet 10. That is, it is enough as long as the light emitting device includes the light source section and the phosphor sheet.

Also, in the foregoing embodiment, although the description has been made with the example of the structure in which the liquid crystal panel is used as the display panel of the display device of the present invention, it is not limited to this, and the present invention is applicable to the other display device.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A light emitting device comprising:
   a light source section;
   a phosphor based color conversion layer converting at least a part of color light emitted from the light source section into another color light;
   a first sealing sheet and a second sealing sheet provided on one surface and on the other surface of the color conversion layer, respectively;
   a first bonding layer provided between the first sealing sheet and the color conversion layer; and
   a second bonding layer provided in a frame shape along the outer circumference of the color conversion layer so as to surround the color conversion layer,
   wherein the sealing sheets include an impermeable layer and a resin layer.

2. The light emitting device according to claim 1, wherein the first sealing sheet is composed by sandwiching the impermeable layer with the resin sheet and another resin sheet.

3. The light emitting device according to claim 1, wherein the impermeable layer is composed of a layer of a material having a low water vapor transmittance.

4. The light emitting device according to claim 3, wherein the impermeable layer is composed of a composite layer of a material having a low water transmittance.

5. The light emitting device according to claim 1, wherein the light source section includes a blue light emitting diode emitting blue (B: Blue) light.

6. The light emitting device according to claim 5, wherein the color conversion layer emits white light as a whole by converting the part of the blue color light into another color light.

7. The light emitting device according to claim 1, wherein the light source section comprises a plurality of light emitting diodes aligned along a direction parallel to a surface of the color conversion layer.

8. The light emitting device according to claim 1, wherein the light source section comprises:
a light emitting diode; and
a light guide plate performing surface emission by propagating light emitted from the light emitting diode.

9. The light emitting device according to claim 8, wherein the color conversion layer is formed on a light incidence face or a light emission face of the light guide plate, and the color conversion layer is covered with the sealing sheet.

10. The light emitting device according to claim 1, wherein the color conversion layer is composed by containing a fluorescent material.

11. The light emitting device according to claim 1, wherein the resin sheet includes at least one material selected from the group consisting of thermoplastic resin, multifunctional acrylate, multifunctional polyolefin, unsaturated polyester, epoxy resin, polyethylene terephthalate (PET), polycarbonate (PC), polymethyl methacrylate (PMMA), polystyrene (PS), polyethylene naphthalate (PEN), polyether sulfone (PES), and cyclic amorphous polyolefin.

12. The light emitting device according to claim 1, wherein the impermeable layer includes at least one material selected from the group consisting of silicon oxide, silicon nitride, magnesium oxide (MgO), indium oxide, aluminum oxide ($Al_2O_3$), and tin oxide, polyvinyl alcohol, ethylene vinyl alcohol copolymer, polyacrylonitrile, and polyvinylidene chloride.

13. The light emitting device according to claim 1, wherein the first bonding layer is provided between a light emission face of the phosphor based color conversion layer and the second sealing sheet to prevent an entry of water vapor into the phosphor based color conversion layer.

14. The light emitting device according to claim 1, wherein the color conversion layer and the first or the second sealing sheet are not in direct contact.

15. A color conversion sheet comprising:
a phosphor based color conversion layer converting at least a part of color light emitted from a light source section into another color light;
a first sealing sheet and a second sealing sheet provided on one surface and on the other surface of the color conversion layer, respectively;
a first bonding layer provided between the first sealing sheet and the color conversion layer; and
a second bonding layer provided in a frame shape along the outer circumference of the color conversion layer so as to surround the color conversion layer,
wherein the sealing sheets include an impermeable layer and a resin layer.

16. A display device comprising:
a light source section;
a display panel driven based on image data;
a phosphor based color conversion layer converting at least a part of color light emitted from the light source section into another color light and guiding to the display panel;
a first sealing sheet and a second sealing sheet provided on one surface and on the other surface of the color conversion layer, respectively;
a first bonding layer provided between the first sealing sheet and the color conversion layer; and
a second bonding layer provided in a frame shape along the outer circumference of the color conversion layer so as to surround the color conversion layer, wherein the sealing sheets include an impermeable layer and a resin layer.

17. The display device according to claim 16, wherein a light diffusion member and a light condensation member are sequentially provided between the light source section and the display panel from the light source section side.

18. The display device according to claim 17, wherein the color conversion layer and the sealing sheet are provided between the light source section and the light diffusion member.

19. The display device according to claim 17, wherein the color conversion layer and the sealing sheet are provided between the light diffusion member and the light condensation member.

20. The display device according to claim 17, wherein
the light diffusion member sequentially includes a light diffusion film and light diffusion plate from the light source section side, and
the color conversion layer and the sealing sheet are provided between the light diffusion film and the light diffusion plate.

* * * * *